United States Patent
Sherwood

(10) Patent No.: US 7,085,812 B1
(45) Date of Patent: Aug. 1, 2006

(54) SYSTEM AND METHOD FOR SELECTIVE APPLICATION OF EMAIL DELIVERY OPTIONS

(75) Inventor: Amy L. Sherwood, Marietta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 738 days.

(21) Appl. No.: 09/921,659

(22) Filed: Aug. 6, 2001

(51) Int. Cl.
*G06F 15/16* (2006.01)
*G06F 3/00* (2006.01)

(52) U.S. Cl. .................. 709/206; 709/207; 715/752
(58) Field of Classification Search ........... 709/206, 709/207
See application file for complete search history.

(56) References Cited

U.S. PATENT DOCUMENTS

| | | | | |
|---|---|---|---|---|
| 5,057,935 A | * | 10/1991 | Williams | 358/402 |
| 5,694,616 A | * | 12/1997 | Johnson et al. | 709/207 |
| 5,832,220 A | * | 11/1998 | Johnson et al. | 709/206 |
| 5,958,005 A | * | 9/1999 | Thorne et al. | 709/207 |
| 6,044,395 A | * | 3/2000 | Costales et al. | 709/206 |
| 6,108,688 A | * | 8/2000 | Nielsen | 709/206 |
| 6,185,603 B1 | * | 2/2001 | Henderson et al. | 709/207 |
| 6,212,553 B1 | * | 4/2001 | Lee et al. | 709/206 |
| 6,247,045 B1 | * | 6/2001 | Shaw et al. | 709/207 |
| 6,775,689 B1 | * | 8/2004 | Raghunandan | 709/207 |
| 2002/0013817 A1 | * | 1/2002 | Collins et al. | 709/206 |
| 2002/0046250 A1 | * | 4/2002 | Nassiri | 709/206 |
| 2002/0194341 A1 | * | 12/2002 | Gupta | 709/206 |

OTHER PUBLICATIONS hnrc.tuffs.edu/departments.csu/faq/homempc.pdf, "How to set your e-mail preferences -for PC users", dated Nov. 2000, pp. 1 and 3.*
"CallPilot Desktop Messaging Quick Reference Guide", Nortel Networks, Date: Apr. 2000, Entire guide.*
"How E-mail Works" by Marshall Brain (www.howstuffworks.com/email.htm), Jun. 14, 2001.
"How Web Servers and the Internet Work" by Marshall Brain (www.howstuffworks.com/web-server.htm), Jun. 14, 2001.
"Simple Mail Transfer Protocol" by Jonathan B. Postel (info.internet.isi.edu/in-notes/rfc/files.rfc821txt), Aug. 1982.

* cited by examiner

Primary Examiner—John Follansbee
Assistant Examiner—Ashok Patel
(74) Attorney, Agent, or Firm—Thomas, Kayden, Horstemeyer & Risley, LLP

(57) ABSTRACT

A system and method, implemented within an email client and/or server, for selectively applying delivery options to addressees in an email includes displaying an address book, choosing addressees from the address book, setting a flag indicating that more than one addressee has been chosen, displaying an email delivery options selection window if the flag is set, selectively applying delivery options to each of the addressees, and sending the email.

12 Claims, 3 Drawing Sheets

SYSTEM AND METHOD FOR SELECTIVE APPLICATION OF EMAIL DELIVERY OPTIONS

BACKGROUND

Field of the Invention

The present invention relates generally to electronic mail systems and features. More specifically, the present invention is directed to an email system that provides selective application of delivery options for email messages with multiple addressees.

BACKGROUND OF THE INVENTION

Electronic mail, or email, has become ubiquitous. Email clients, which are in communication with associated email servers, are loaded on virtually every computer that is connected to a local area network and/or the internet. As a result, the speed at which people can communicate with each other has increased substantially as compared with conventional "snail mail." Similarly, even simple communications channels, such as the venerable internal office memo or break room bulletin board, have been abandoned in favor of, for example, more efficient email broadcasting, wherein a single email is written and sent to several people (perhaps hundreds or even thousands of people) at the same time, all simply by the click of a "send" button.

As a result of the popularity of email, developers of email systems (i.e., the programs that implement email functionality) have offered increasingly functionally-rich email clients and servers. For example, address books that can be sorted in any number of ways, files systems via which received emails can be organized, and automated encryption engines are features that are commonly provided by several email system developers.

Two of the more well-known email features are the email delivery option features commonly known as "delivery confirmation" and "return receipt" (although those skilled in the art may also refer to the latter feature as "read receipt"). When the delivery confirmation option is enabled for a first email message and the first email message is successfully delivered, the sender receives a report that the first email was successfully delivered to a "mailbox" belonging to the recipient.

The "read receipt" or return receipt option provides even further information about a sent email. When the return receipt option is selected for a first email message sent by a sender, a second email message is sent back to the sender as soon as the first email is opened from the recipient's mailbox. Both the delivery confirmation and return receipt features of email systems are well known in the art.

While the delivery confirmation and return receipt options are often very useful tools for tracking email messages, the current implementations of these features are inflexible. Specifically, current email systems, such as MICROSOFT OUTLOOK, available from Microsoft Corp., Redmond, Wash., requires that the delivery confirmation or return receipt delivery option be associated with the entirety of an email message. More specifically, delivery confirmation and/or return receipt options are applied to the entire address list of an outgoing email message, no matter how many addressees may be included. Thus, where, for example, an email sender might send the same email to 100 addressees/recipients, that sender may only be concerned with tracking whether two or three of those recipients have actually received and opened the email message. This could be the case in a corporation where it is desirable that many people receive the information in the sender's email, but where it is only critical that it can be confirmed that a handful of people, e.g. management level employees, receives that information.

Moreover, in current email system implementations where the entire addressee list is associated with a delivery confirmation or return receipt action, a great deal of unnecessary strain is placed on the electronic network that services the email sender in view of the potentially large number of undesired email delivery confirmations and return receipts that are generated and sent through the network. In addition, the original sender is unnecessarily barraged by the large number of unwanted emails, resulting in lower productivity and wasted time. Disk storage space is also unnecessarily consumed by the excessive delivery confirmations and return receipts. Thus, there is a need for an improved email delivery option implementation.

SUMMARY OF THE INVENTION

The present invention overcomes the drawbacks of current email delivery option implementations by providing a system and method for selective application of email delivery options in which individual addressees from a list of addressees can be selected, or singled out, for a particular delivery option.

In accordance with an embodiment of the present invention, when a new email is generated by a sender, the email client (or server) determines if more than one addressee is included in the address list. If more than one addressee is listed, and a delivery option such as delivery confirmation or return receipt is selected or is automatically selected as a default configuration, then the email client preferably displays a window via which the email sender can selectively apply delivery options to each of the addressees.

In another embodiment, the email client provides an enhanced "address book" function in which the sender can selectively apply delivery options to addressees as each addressee is selected from the address book.

In another aspect of the present invention, the email client stores a list of addressees (e.g., a "group") including the desired delivery option associated with each person.

It is therefore an object of the present invention to save time, network capacity and data storage requirements by providing a system and method for selectively applying email delivery options to selected addressees from a list of addressees.

It is another object of the present invention to provide a system and method for applying different delivery options to different addressees in the same email message.

It is still another object of the present invention to provide a system and method for selective application of email delivery options wherein an email sender selects the delivery options at the time the email sender selects addressees for the email.

It is also an object of the present invention to provide a system and method of providing selective application of email delivery options in which a list of delivery option configurations are stored for later use as a default configuration.

These and other objects of the present invention will become apparent upon a reading of the following detailed description in conjunction with the associated drawings.

DETAILED DESCRIPTION OF THE INVENTION

In view of drawbacks of current email delivery option implementations, the present invention provides an improved email delivery option selection mechanism. In prior art email systems, an email sender might first compose an email message and then determine to whom the message should be sent. Choosing addressees (or "addresses," which is sometimes used interchangeably herein) for the email might include typing an address directly into a "To" edit box or choosing one or more names from an address book. In addition to composing and addressing an email message, the email sender, in prior art email systems, also has an option of establishing or selecting delivery options for the email that is about to be sent.

Figure 1:
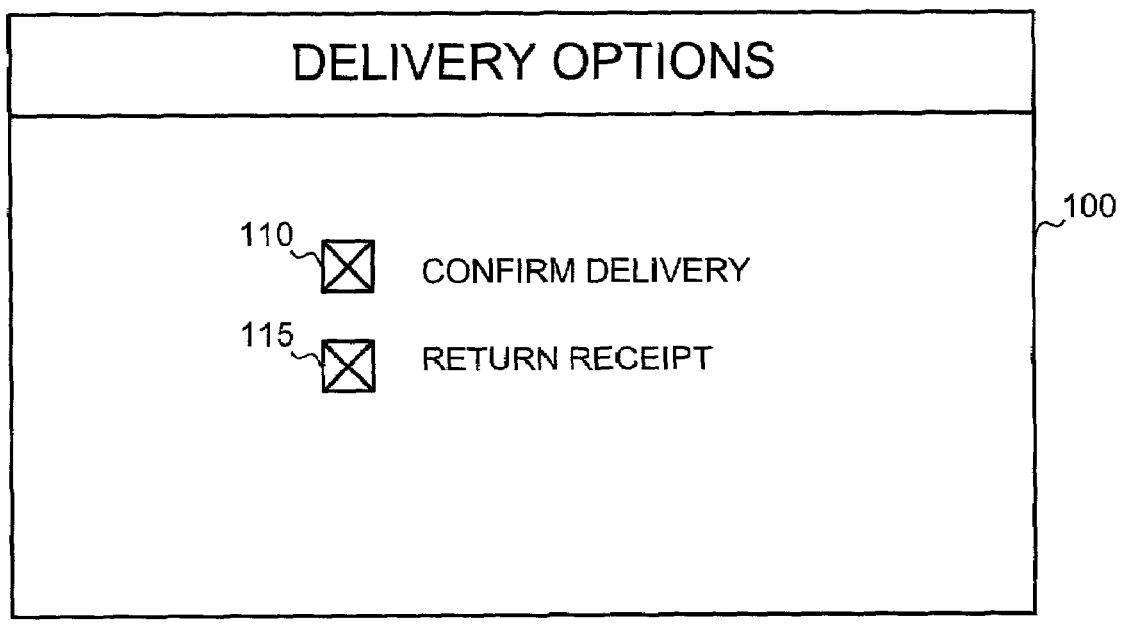
FIG. 1 illustrates a prior art email message delivery options selection window.

FIG. 1 shows a typical delivery options menu 100 including a "confirm delivery" checkbox 110 and "return receipt" checkbox 115. FIG. 1 shows a state in which both of these delivery options are enabled such that subsequent to the email being sent, a delivery confirmation is generated for each addressee and a return receipt email message is also generated for each addressee, depending on the email system associated with each of the recipients.

However, it is often the case that the email sender is not interested in receiving such delivery confirmations or return receipts from each of the addressees, but rather is interested in receiving such messages only from a selected number of addressees from the list of addressees in the email. Not only is it an inconvenience to receive unwanted or unnecessary delivery confirmations or return receipts, but the generation and receipt of those messages causes an email server to handle unnecessary messages, causes unnecessary network traffic and further causes potential data storage issues if the number of such messages become too large.

In accordance with the present invention, a method and system for selectively applying email delivery options is provided. Preferably, the invention is implemented in software as part of an email client that resides on a user's computer system and/or an email server that might be remote from the user's computer.

Figure 2:
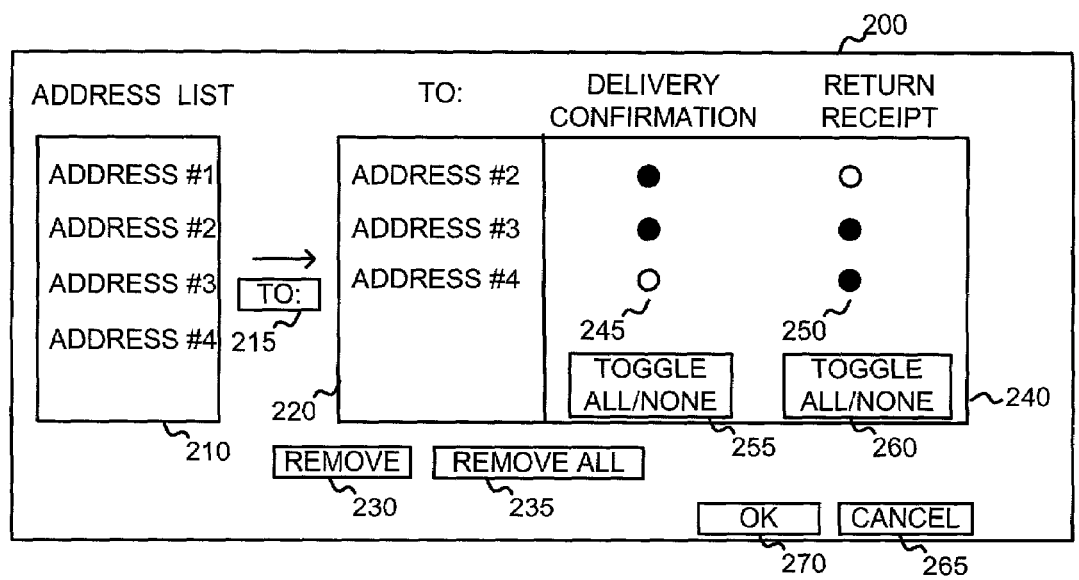
FIG. 2 shows an exemplary selective email delivery options application window in accordance with the present invention.

FIG. 2 illustrates an exemplary implementation of the present invention. Specifically, when an email sender decides to use an address book to select addressees for a particular email, a window such as the exemplary window indicated as 200 in FIG. 2 preferably appears on the user's computer display. The list of addresses 210 is provided on the left-hand side of window 200 and a button 215 is provided in order to select highlighted addresses from address list 210 in the conventional manner. That is, when a particular address in address list 210 is highlighted and button 215 is clicked using a mouse or other pointing device, the highlighted address from the list of addresses 210 is put into the To list 220. Highlighted addresses can be removed selectively using button 230 and all of the addresses in the To list 220 can be removed by clicking on button 235. In addition to these conventional aspects of an address book, in accordance with the present invention there is also provided an area 240 that includes two columns of, for example, "radio buttons". A first column 245 represents the option of delivery confirmation while the second column 250 represents a return receipt option. Thus, as can be seen in FIG. 2, a user can selectively apply either delivery confirmation and/or return receipt to any one or all of the addressees in To list 220. Further, two buttons 255, 260 are preferably provided that permit a user to apply delivery confirmation or return receipt to all or none of the addressees listed in To list 220. Finally, also provided are a conventional cancel button 265 and OK button 270.

In operation, when a user accesses his address book, the window of FIG. 200 preferably appears. After selecting each of the addressees that are to be included in the email that was or is being composed, the user also clicks on each of the radio buttons 245, 250 as desired in order to selectively apply the desired delivery option for that particular addressee. The user then clicks OK button 270 to continue with the email composing/sending process in accordance with the conventional emailing process.

Figure 3:
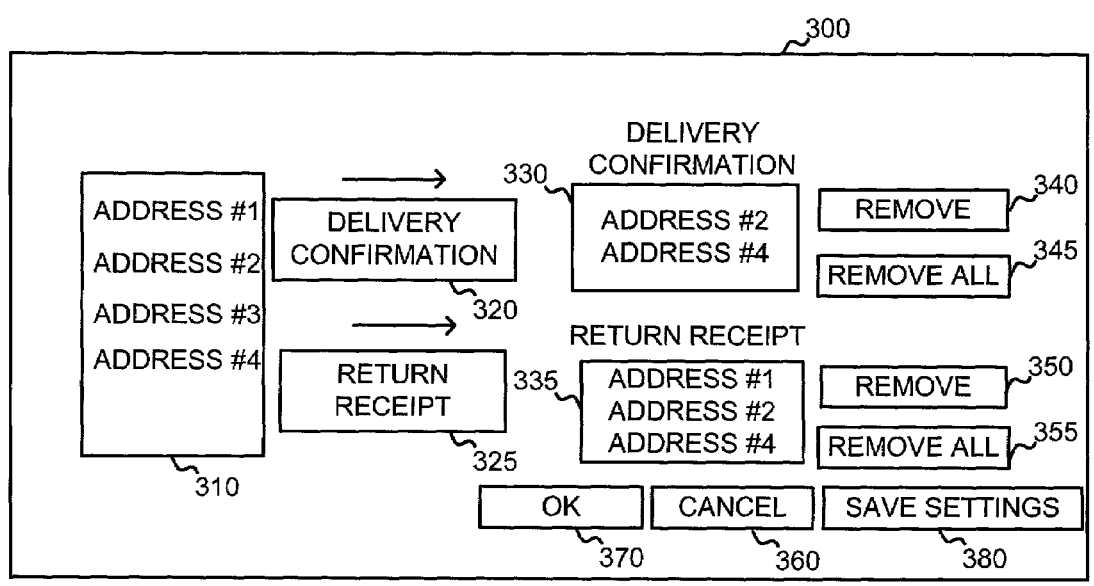
FIG. 3 shows another selective email delivery options window in accordance with the present invention.

FIG. 3 depicts another embodiment in accordance with the present invention to selectively apply delivery options to one or more addressees included in a longer list of addressees associated with a single email. Specifically, after the email addressees have been selected either from an address book or by directly typing in addresses in an edit box, window 300 as shown in FIG. 3 is preferably shown on the user's computer either as, for example, a result of clicking on the "Send" button of the email client or, for example, when a cursor is moved away from the edit box in which addressees have been typed. Precisely when window 300 illustrated in FIG. 3 is displayed is a matter of preference and, thus, those skilled in the art will appreciate that the timing of when such a window would be displayed is not a critical feature of the present invention.

In any event, window 300 of FIG. 3 presumes that at least some of the addressees to which the email being composed are to be sent have already been somehow selected. Those addressees are listed in address list 310. Then, in accordance with the present invention, delivery options can be selectively applied to each of these addressees. Specifically, button 320 can be selected to place a highlighted addressee from address list 310 into the delivery confirmation list 330. Similarly, button 325 can be clicked using a mouse, for example, in order to place a highlighted addressee from address list 310 into return receipt list 335. In this way, a user can easily see which delivery option is being applied to each addressee. Preferably also included for each delivery option list 330, 335 are "remove" and "remove all" buttons 340, 345, 350, 355, which can be used to remove selected, i.e., highlighted, addressees or to remove all addressees in the associated delivery option list 330, 335. Finally, cancel button 360 and an OK button 370 are also provided in order to cancel the entire delivery option process or to continue with the email functionality as provided by the particular email client.

Figure 4:
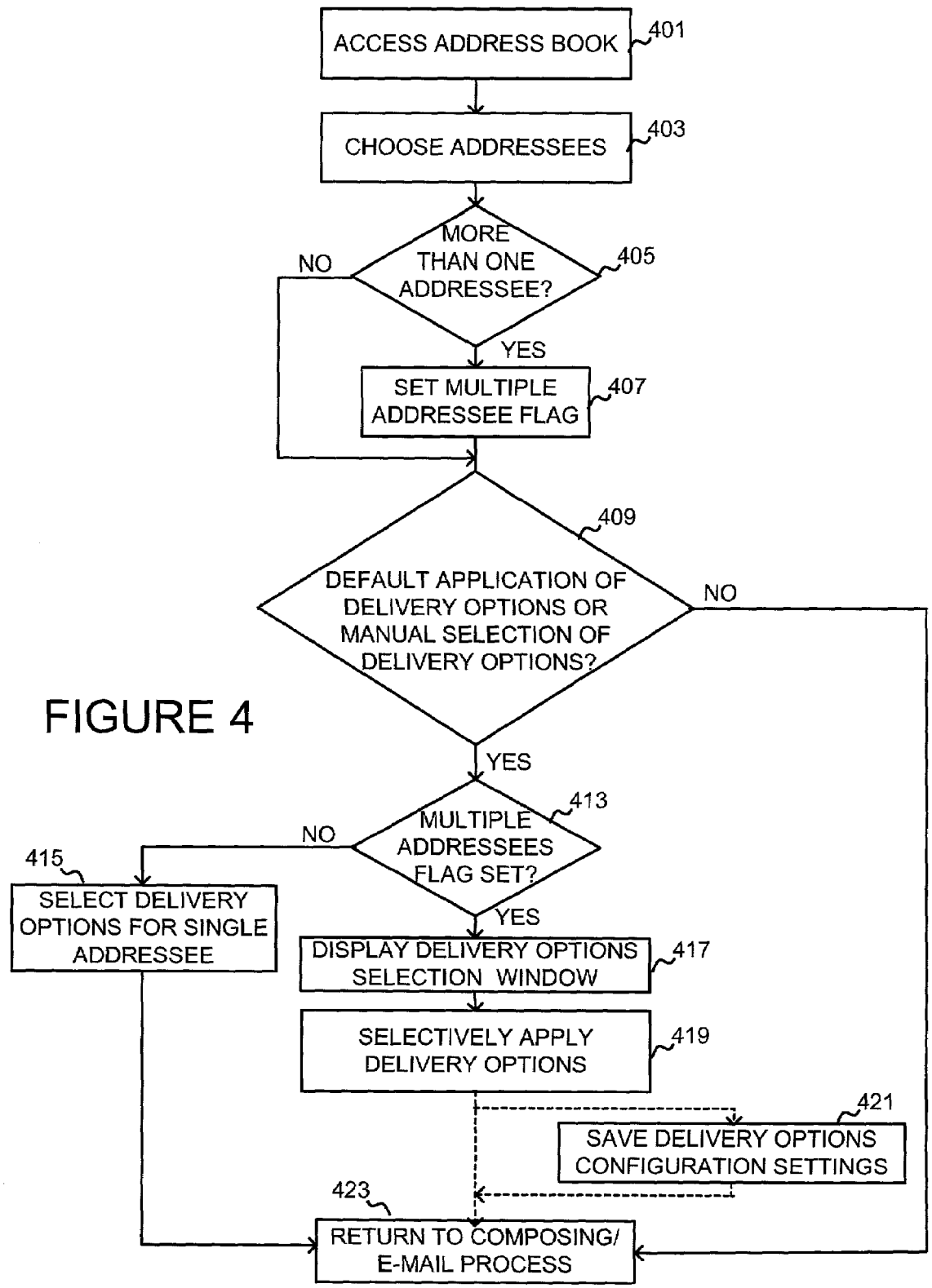
FIG. 4 depicts a flowchart illustrating an exemplary process for implementing selective application of email delivery options in accordance with the present invention.

FIG. 4 depicts an exemplary process 400 for implementing a selective email delivery option application that could be used to trigger, for example, the display of window 300 as shown in FIG. 3. Specifically, as shown in FIG. 4, a user accesses an address book at step 401 and then chooses one or more addressees from the address book at step 403. At this point, the address book might be closed. Then, at step 405 it is determined whether more than one addressee was selected in step 403. If there was more than one addressee selected, then a multiple addressee flag is set at step 407. If it was determined at step 405 that there was only one addressee, then the multiple addressee flag is left unset. Then at step 409, it is determined whether delivery options application is set as a default. That is, in accordance with the present invention, an email client preferably includes a configuration setting via which it is possible to set whether delivery options will be presented to the user during each email composition session. If no such default configuration setting is available, or it is further determined at step 409 that the user does not wish to apply delivery options to the email that is being composed by manually accessing a delivery options function, then at step 423 the email process returns to the conventional email composition and sending process.

On the other hand, if the application of delivery options was set as a default or the user manually selects delivery options, then at step 413 it is determined whether the multiple addressee flag has been set. If not, then at step 415, the delivery options for the single email are selected as is conventional and then the process returns to the conventional email composition and sending process at step 423. If, at step 413, it is determined that the multiple addressee flag is set, then at step 417 a selective application of delivery options window, like that shown in FIG. 3, is preferably displayed for the user. The user then selects the desired delivery options for each of the addressees in the list. The process then continues at step 423 with the conventional email composition and sending process.

Optionally, there is also provided a step 421 wherein a file is saved that includes the configuration of the delivery options for each addressee in a group of addressees. Accordingly, in subsequent emails, the email client (or server) preferably determines whether selected addressees match a previously selected group of addressees and, if so, automatically sets the delivery options for each of the addressees that were selected in the previous case. Of course, a user is preferably able to reconfigure any of these settings. A button 380 for causing the delivery options configuration settings to be saved may also be provided, for example, in the window of FIG. 3.

From an actual implementation point of view, conventional email server processes may be harnessed to implement the present invention. For example, although from the user's perspective a single email is being sent, the email server may parse the selected delivery options and combine or group addressees with similar options. Email messages with identical delivery options could then be sent together as a group. Alternatively, the email server that implements the principles of the present invention might simply handle each of the addressees in the address list 220 or 310 as separate email messages whereby multiple email messages are sent to the email server for transmission to the respective recipients along with the desired delivery options.

As can be readily appreciated by the foregoing, the present invention provides significant advantages over conventional implementations of the application of delivery options to email messages. For example, in accordance with the present invention, it is possible to selectively apply delivery options to any one or a number of addressees selected from a list of addressees. Thus, it is possible to avoid generating unnecessary or unwanted email delivery notifications that are returned to the original sender of the email message. As a result, it is also possible to avoid network congestion as well as data storage concerns.

In addition, when a user implements the option of saving the delivery options configuration for a particular email message, time is saved for generating and setting up the addressee list for any subsequent emails having similar addressees.

Those skilled in the art will also appreciate that while the present invention has been described with respect to the delivery options of delivery confirmation and return receipt, other delivery options may also be selectively applied to individual addressees in accordance with the principles of the present invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for selectively applying a delivery notification option to an email comprising:
    listing email addresses;
    selecting a plurality of said email addresses in the course of composing an email message;
    maintaining a first list for a first type of delivery notification option and a second list for a second type of delivery notification option;
    selectively applying the delivery notification option to one or more, but not all, of said plurality of email addresses;
    moving each of the one or more email addresses with a delivery notification option applied to it into the first list, second list, or both lists corresponding to the selected delivery notification option;
    displaying an address book with the listed email addresses;
    setting a flag indicating that more than one address has been chosen;
    displaying an email delivery notification options selection window if said flag is set wherein the email delivery notification options selection window permits selective application of at least one of delivery confirmation and read receipt;
    saving a configuration of delivery notification option settings that is associated with a first set of addresses;
    matching a second set of addresses with the first set of addresses and automatically setting delivery notification options with respect to the first set of addresses;

selecting the delivery notification option from the options of delivery confirmation and read receipt and sending the email to said plurality of email addresses.

2. The method of claim 1, further comprising sending a separate email for a group of addresses that have the same delivery notification option configuration.

3. The method of claim 1, further comprising sending a separate email to each address of said plurality of addresses.

4. The method of claim 1, further comprising selectively applying more than one delivery notification option to one or more, but not all, of said plurality of email addresses.

5. The method of claim 1, further comprising saving a configuration of delivery notification option settings that is associated with a first set of addresses.

6. The method of claim 5, further comprising matching a second set of addresses with the first set of addresses and automatically setting delivery notification options saved with respect to the first set of addresses.

7. The method of claim 1, wherein the delivery notification option is selected from the options of delivery confirmation and read receipt.

8. An email system for providing selective application of delivery notification options to individual addresses in a single email, comprising:
   means for listing email addresses on a computer;
   means for selecting a plurality of said email addresses in the course of composing an email message;
   means for maintaining a first list for a first type of delivery notification option and a second list for a second type of delivery notification option;
   means for selectively applying the delivery notification option to one or more, but not all, of said plurality of email addresses;
   means for saving a configuration of delivery notification option settings that is associated with a first set of addresses;
   means for matching a second set of addresses with the first set of addresses and automatically setting delivery notification options saved with respect to the first set of addresses;
   means for moving each of the one or more email addresses with a delivery notification option applied to it into the first list, second list, or both lists corresponding to the selected delivery notification option;
   wherein the delivery notification option is selected from delivery confirmation and read receipt; and
   means for sending the email to said plurality of email addresses.

9. The system of claim 8, further comprising means for sending a separate email for a group of addresses that have the same delivery notification option configuration.

10. The system of claim 8, further comprising means for sending a separate email to each address of said plurality of addresses.

11. The system of claim 8, further comprising means for selectively applying more than one delivery notification option to one or more, but not all, of said plurality of email addresses.

12. An email system for selectively applying delivery notification options to an email having a plurality of addressees, comprising:
   an email client operable to display an address list and to select addressees for an email; and
   an email server in communication with the email client and connected to a network;
   wherein at least one of the email client and the email server is operable to selectively apply, corresponding to input from a user, a delivery notification option to one or more, but not all, of the addressees;
   wherein at least one of the email client and the email server is further operable to maintain a first list for a first type of delivery notification option and a second list for a second type of delivery notification option; and to move each of the one or more email addresses with a delivery notification option applied to it into the first list, second list, or both lists corresponding to the selected delivery notification option as selected by a user;
   wherein one of the email client and email server, corresponding to input from a user, sends a separate email for a group of addressees that have the same delivery notification option configuration;
   wherein one of the email client and email server, corresponding to input from a user, saves a configuration of delivery notification option settings that is associated with a first set of addressees;
   wherein one of the email client and email server matches a second set of addressees with the first set of addressees and automatically sets delivery notification options saved with respect to the first set of addressees;
   wherein the delivery notification options comprise delivery confirmation and read receipt;
   wherein one of the email client and the email server is configured to set a flag indicating that more than, one address has been chosen;
   wherein one of the email client and the email server is configured to display an email delivery notification options selection window if said flag is set wherein the email delivery notification options selection window permits selective application of at least one of delivery confirmation and read receipt.

* * * * *